United States Patent [19]

Suzuki

[11] Patent Number: 5,578,760
[45] Date of Patent: Nov. 26, 1996

[54] SEAL DIAPHRAGM STRUCTURE FOR PRESSURE MEASURING DEVICE

[75] Inventor: Motoo Suzuki, Tokyo, Japan

[73] Assignee: Yamatake-Honeywell Co., Ltd.

[21] Appl. No.: 398,805

[22] Filed: Mar. 6, 1995

[30] Foreign Application Priority Data

Mar. 17, 1994 [JP] Japan .................... 6-071268

[51] Int. Cl.$^6$ .......................................... G01L 7/00
[52] U.S. Cl. ............................................ 73/706
[58] Field of Search ................... 73/706, 715, 716, 73/717, 718, 719, 720, 721, 726, 727, 756

[56] References Cited

U.S. PATENT DOCUMENTS

| 4,072,056 | 2/1978 | Lee ........................................ 73/706 |
| 5,230,248 | 7/1993 | Cucci et al. ............................ 73/706 |
| 5,315,875 | 5/1994 | Benedikt et al. ....................... 73/706 |
| 5,375,473 | 12/1994 | Ikeda et al. .......................... 73/706 |

FOREIGN PATENT DOCUMENTS

| 59-30444 | 8/1984 | Japan . |
| 62-86528 | 6/1987 | Japan . |
| 5209800  | 8/1993 | Japan . |

Primary Examiner—Richard Chilcot
Assistant Examiner—William L. Oen
Attorney, Agent, or Firm—Lane, Aitken & McCann

[57] ABSTRACT

A seal diaphragm structure for a pressure measuring device includes a seal diaphragm, an insulating film, and an p-type semiconductor film. The seal diaphragm has a first surface opposing a target fluid and a second surface contacting a pressure transfer sealed liquid sealed in the pressure measuring device. The insulating film is formed on the first surface of the seal diaphragm. The p-type semiconductor film is formed on the insulating film.

6 Claims, 3 Drawing Sheets

SEAL DIAPHRAGM STRUCTURE FOR PRESSURE MEASURING DEVICE

BACKGROUND OF THE INVENTION

The present invention relates to a seal diaphragm structure for a pressure measuring device for measuring a differential pressure, a pressure, and the like in accordance with the displacement of a seal diaphragm and, more particularly, to an improvement of the surface structure of the seal diaphragm.

As a typical pressure measuring device of this type, a differential pressure/pressure transmitter for measuring the pressure of a process fluid by measuring the difference in pressure between two points is known. A differential pressure/pressure transmitter of this type is generally designed such that process fluid pressures are respectively applied to seal diaphragms on the high- and low-pressure sides, and the moving amount of a sealed liquid in a detector body is extracted as an electrical output on the basis of the distortion of a semiconductor pressure sensor arranged by partitioning a sealed circuit (Japanese Utility Model Publication No. 59-30444).

In the differential pressure/pressure transmitter having the above arrangement, some of hydrogen atoms contained in a fluid to be measured (target fluid) are permeated through the seal diaphragms and enter the sealed liquid to stay as hydrogen gas. When hydrogen gas stays, the pressure of the sealed liquid changes. Consequently, accurate differential pressure measurement cannot be performed, or the seal diaphragms themselves deteriorate owing to hydrogen embrittlement, resulting in incapability of measurement.

In addition, various positive metal ions (e.g., $Zn^{++}$ and $Al^{++}$) are present in a target fluid. In the conventional device, if these ions adhere to the seal diaphragms, local batteries are formed to cause corrosion.

The mechanism for causing hydrogen atoms to enter and stay in a sealed liquid is estimated as follows.

If a metal (stainless steel, carbon steel, or the like) as a material for the detector body, the cover of each seal diaphragm, or the like is baser (larger in ionization tendency) than a metal as a material for the seal diaphragm, the metal (M) of the detector body or the cover is eluted in the target fluid to emit electrons, as indicated by the following chemical formula:

$$M \rightarrow M^{2+} + 2e^- \qquad (1)$$

Subsequently, the reaction based on the following chemical formula mainly occurs:

$$2H^+ + 2e^- \rightarrow 2H \qquad (2)$$

If, therefore, the reaction indicated by chemical formula (2) occurs on the seal diaphragm side, most of the hydrogen atoms adsorbed in the surface of the diaphragm become hydrogen molecules, i.e., hydrogen gas, on the basis of the following chemical formula:

$$2H \rightarrow H_2 \qquad (3)$$

This hydrogen gas $H_2$ cannot be permeated through the seal diaphragm because of the size of a hydrogen molecule. However, some of the hydrogen atoms H in the state indicated by chemical formula (2) are diffused and permeated through the seal diaphragm and enter the sealed liquid to become hydrogen gas.

In order to prevent such permeation of hydrogen atoms H, there have been provided a method of coating gold (Au) on the surface of a seal diaphragm by plating (Japanese Utility Model Laid-Open No. 62-86528) and a method of coating metal and insulating layers on the surface of a seal diaphragm to form a multilayer structure (Japanese Patent Laid-Open No. 5-209800).

In such methods, however, the following problems are posed.

In the method of coating Au, since Au itself is low in density and has an ion trap function, Au has an effect of preventing diffusion and permeation of adsorbed hydrogen atoms. However, the thickness of an Au film is limited in terms of the response characteristics of a seal diaphragm, and permeation of hydrogen atoms cannot be completely prevented.

In addition, if Au which is smaller in ionization tendency than a metal used for the detector body, the cover, or the like is coated on the surface of each seal diaphragm, an electrical circuit is formed because of a potential difference between, e.g., Au and the cover. In this case, if a pinhole is formed in the Au coating, a target fluid is brought into direct contact with the seal diaphragm via the pinhole. As a result, a local battery is formed by the above electrical circuit, and the seal diaphragm itself corrodes locally. The seal diaphragm generally has a thickness of about 0.1 mm. If a hole is formed in the seal diaphragm because of corrosion, measurement cannot be performed.

In the multilayer coating method disclosed in Japanese Patent Laid-Open No. 5-209800, as shown in FIG. 3, a hydrogen permeation preventing metal layer 26, an intermediate metal layer 27, and an insulating layer 28 are sequentially coated on a surface 25a of a seal diaphragm 25 which is in contact with a target fluid, and the hydrogen permeation preventing metal layer 26 serves to prevent permeation of hydrogen atoms H. The intermediate metal layer 27 reduces the stress caused by the difference in coefficient of linear expansion between the hydrogen permeation preventing metal layer 26 and the insulating layer 28, thereby improving the adhesion properties of the coating layer. The intermediate metal layer 27 consists of a metal (e.g., titanium, tungsten, chromium, or molybdenum) which is larger in ionization tendency than a metal (e.g., gold or tungsten) as a material for the hydrogen permeation preventing metal layer 26 and has an intermediate linear expansion coefficient between the linear expansion coefficient of the metal used for the hydrogen permeation preventing metal layer 26 and that of a material for the insulating layer 28. With this structure, a potential difference between the seal diaphragm and a detector body 29 is reduced to reduce/prevent corrosion due to the formation of local batteries. The insulating layer 28 serves to maintain the high corrosion resistance of the seal diaphragm 25 and prevent an electrochemical reaction on the surface on the target fluid side. The insulating layer 28 consists of a ceramic material, typically SiC, $Al_2O_3$, AlN, $SiO_2$, or the like. Reference numeral 30 denotes a sealed liquid; and 31, a target fluid.

According to such a seal diaphragm surface structure, however, since the hydrogen permeation preventing metal layer 26, the intermediate metal layer 27, and the insulating layer 28 must be sequentially coated on the surface 25a of the seal diaphragm 25 which is brought into contact with the target fluid 31, the number of film formation steps is as large as three, and the time required for the manufacture is long. In addition, if the thickness of each layer is increased to prevent permeation of hydrogen atoms H, the manufacturing time is prolonged accordingly. Furthermore, the rigidity of the seal diaphragm itself increases. As a result, the response characteristics of the seal diaphragm deteriorate.

SUMMARY OF THE INVENTION

It is an object of the present invention to provide a seal diaphragm structure for a pressure measuring device which allows a decrease in the number of film formation steps to shorten the time required for film formation.

It is another object of the present invention to provide a seal diaphragm structure for a pressure measuring device which can prevent diffusion and permeation of hydrogen atoms and hydrogen embrittlement of a diaphragm more reliably.

In order to achieve the above objects, according to the present invention, there is provided a seal diaphragm structure for a pressure measuring device, comprising a seal diaphragm having a first surface opposing a target fluid and a second surface contacting a pressure transfer sealed liquid sealed in the pressure measuring device, an insulating film formed on the first surface of the seal diaphragm, and a p-type semiconductor film formed on the insulating film.

DESCRIPTION OF THE PREFERRED EMBODIMENT

Figure 2:
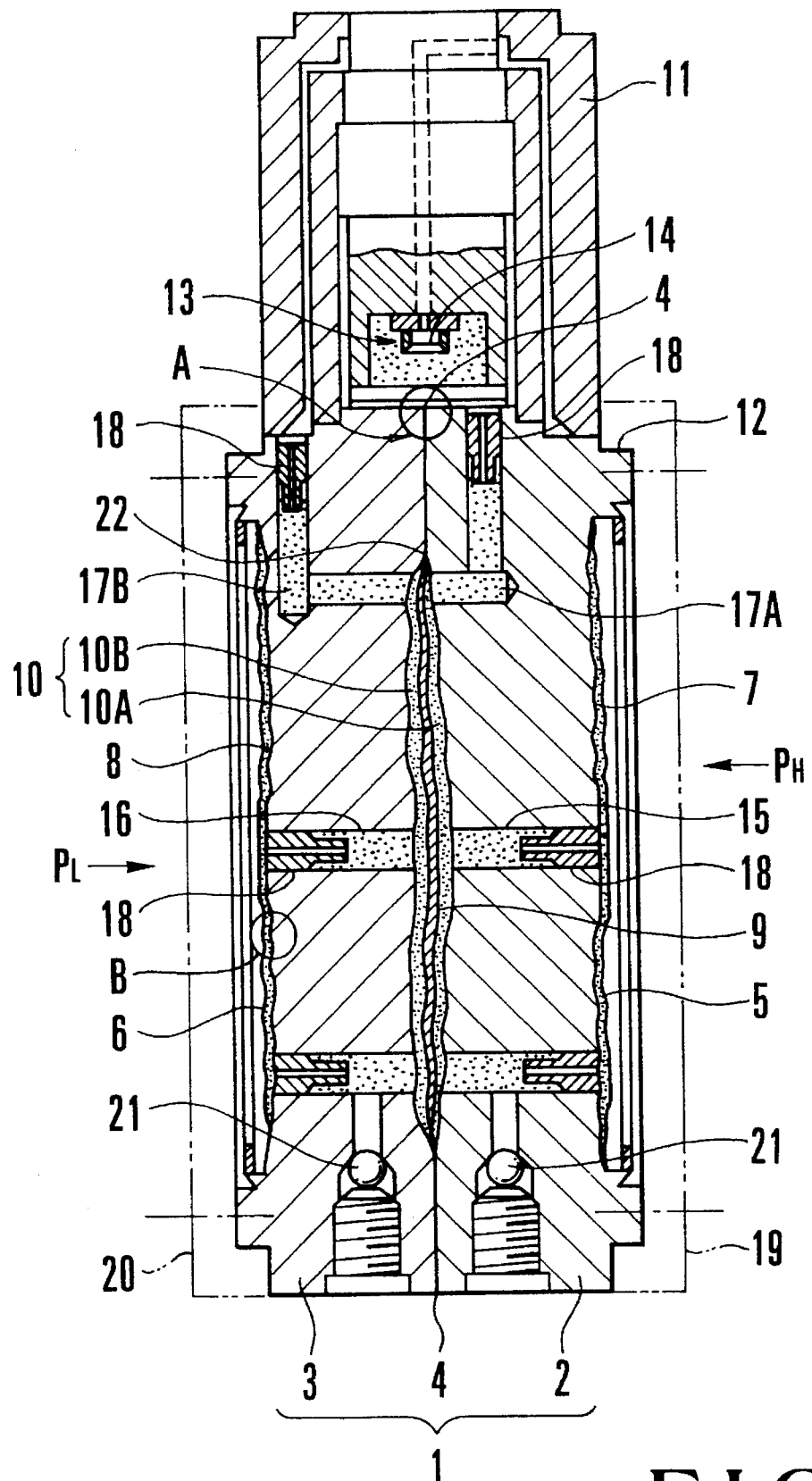
FIG. 2 is a sectional view showing the pressure measuring device according to an embodiment of the present invention.

FIG. 2 shows a pressure measuring device according to an embodiment of the present invention. Reference numeral 1 denotes a thick, disk-like detector body formed by integrally joining a high-pressure body 2 to a low-pressure body 3 using an electron beam and the like; 4, a weld of the detector body 1; and 5 and 6, disk-like seal diaphragms whose peripheral portions are welded/fixed to pressure-receiving surfaces 7 and 8 of high- and low-pressure constituted by corrugated surfaces formed on the detector body 1. When corrosion resistance is required, the seal diaphragms 5 and 6 are made of a material such as tantalum, titanium, stainless steel, or an Ni-based alloy. The middle portions of the seal diaphragms 5 and 6 which oppose the pressure-receiving surfaces 7 and 8 are concentric corrugated surfaces having the same shape as that of the pressure-receiving surfaces. Reference numeral 9 denotes a center diaphragm partitioning an inner chamber 10, which is arranged at the weld of the detector body 1, into a high-pressure body inner chamber 10A and a low-pressure body inner chamber 10B; 11, a header cover welded/fixed to a header cover mount portion 12 formed on the outer surface of an upper portion of the detector body 1; and 13, a semiconductor pressure sensor for measuring a differential pressure, which is incorporated in the header cover 11. High and low pressures PH and PL of a process fluid are transferred to the upper and lower surfaces of a diaphragm 14 of the pressure sensor 13 via sealed liquids 17A and 17B for transferring pressures, such as silicone oil sealed in sealed circuits 15 and 16 inside the detector body 1. A restrictor 18 is pressed/fixed in the sealed circuits 15 and 16. With this structure, abrupt pressure variations and pulsation of a process fluid are restricted to protect the center diaphragm 9 and the pressure sensor 13. Reference numerals 19 and 20 denote covers having process fluid inlets (not shown) fitted/fixed in the respective side surfaces of the detector body 1.

In the differential pressure/pressure transmitter having the above arrangement, when the high and low pressures PH and PL of the process fluid are respectively applied to the seal diaphragms 5 and 6, the seal diaphragms 5 and 6 are displaced in accordance with the differential pressure (PH–PL) at this time, and the sealed liquids 17A and 17B are moved owing to the displacement. As a result, the center diaphragm 9 is displaced. In addition, the differential pressure based on the displacement of the center diaphragm 9 is transferred to the diaphragm 14 of the pressure sensor 13 via the sealed liquids 17A and 17B. As a result, the diaphragm 14 is deformed in accordance with the differential pressure between the sealed liquids 17A and 17B, and the amount of deformation is extracted as an electrical signal, thereby performing differential pressure measurement.

Figure 1:
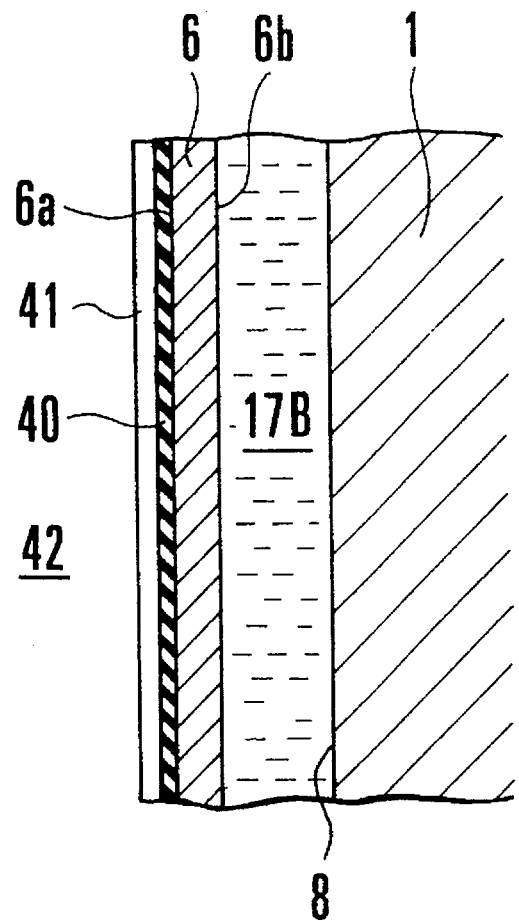
FIG. 1 is an enlarged sectional view showing a seal diaphragm portion of a pressure measuring device in FIG. 2.

FIG. 1 shows showing a seal diaphragm portion corresponding to a portion B in FIG. 2. Referring to FIG. 1, an insulating film 40 is formed on a surface 6a of the seal diaphragm 6 which is brought into contact with a target fluid 42, and a p-type semiconductor film 41 is formed on the insulating film 40. The insulating film 40 is in contact with the target fluid 42. The sealed liquid 17B is sealed between the seal diaphragm 6 and the pressure-receiving surfaces 7 and 8, and the other surface 6b of the seal diaphragm 6 is in contact with the sealed liquid 17B.

If the p-type semiconductor film 41 is directly formed on the surface of the seal diaphragm 6, a current may flow therebetween. The insulating film 40 prevents this by electrically insulating the p-type semiconductor film 41 from the seal diaphragm 6. As a material for the insulating film 40, a nonconductive ceramic material such as $Al_2O_3$, $TiO_2$, or $SiO_2$ is used. The thickness of the insulating film 40 is set on the micron order.

As a material for the p-type semiconductor film 41, Si+B, $Cr_2O_3$, an organic compound semiconductor, or the like is used. The thickness of the p-type semiconductor film 41 is set on the micron order, similar to the insulating film 40. These p-type semiconductor film 41 and insulating film 40 are preferably formed by vapor deposition, CVD, sputtering, or the like.

In the differential pressure/pressure transmitter including the seal diaphragm 6 having such a surface structure, a deterioration of the seal diaphragm 6 due to hydrogen embrittlement, permeation of hydrogen atoms through the seal diaphragm 6, corrosion of the seal diaphragm 6 due to local batteries, and the like can be reliably prevented.

The p-type semiconductor film 41 is an impurity-doped semiconductor obtained by doping a Group III element as an impurity into an intrinsic semiconductor. The impurity deprives electrons of the semiconductor to cause ionization upon formation of homopolar bonds. As a result, portions from which electrons are deprived becomes holes which are positively charged. Such an impurity is called an acceptor. A semiconductor in which conduction by means of holes is dominant is a p-type semiconductor. The p-type semiconductor film 41 attracts $e^-$ in chemical formula (1) but repels $H^+$ in chemical formula (2). Therefore, the reaction indicated by chemical formula (2) does not easily occur near the seal diaphragm 6. As a result, no hydrogen atoms H are generated, and hence no hydrogen atoms H are permeated through the seal diaphragm 6. In this case, $e^-$ flowing in the p-type semiconductor film 41 may be grounded.

As described above, when various positive metal ions (e.g., $Zn^{++}$ and $Al^{++}$) present in the target fluid 42 adhere to the seal diaphragm 6, local batteries are formed to cause corrosion. In the present invention however, since these metal ions repel holes, similar to $H^+$, and hence do not adhere to the p-type semiconductor film 41. Therefore, no local batteries are formed between the metal ions and the seal diaphragm 6. This prevents corrosion.

Figure 3:
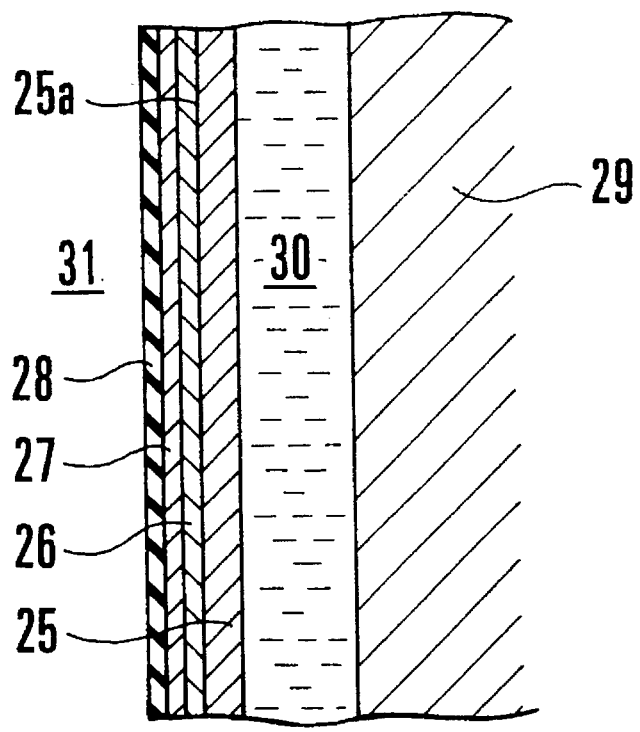
FIG. 3 is an enlarged sectional view showing the main part of a seal diaphragm having a conventional structure.

In addition, according to the present invention, since the two layers, the insulating film 40 and the p-type semiconductor film 41, need only be formed, the number of film formation steps is smaller than that for the conventional diaphragm structure shown in FIG. 3 by one step. Therefore, the manufacturing time can be shortened. Furthermore, since Au need not be used, an inexpensive device can be realized.

The above embodiment has exemplified the differential pressure/pressure transmitter having a pair of seal diaphragms. It is apparent, however, that the present invention can be applied to a pressure measuring device having one seal diaphragm.

What is claimed is:

1. A seal diaphragm structure for a pressure measuring device, comprising:

a seal diaphragm having a first surface opposing a target fluid and a second surface contacting a pressure transfer sealed liquid sealed in said pressure measuring device;

an insulating film formed directly on to wholly cover the first surface of said seal diaphragm; and a p-type semiconductor film formed directly to wholly cover said insulating film.

2. A structure according to claim 1, wherein said insulating film insulates said seal diaphragm from said p-type semiconductor film, and said p-type semiconductor film repels hydrogen ions in the target fluid to prevent generation of hydrogen atoms near said seal diaphragm, thereby preventing hydrogen atoms from being permeated through said seal diaphragm.

3. A structure according to claim 1, wherein each of said insulating film and said p-type semiconductor film is formed to have a thickness of several μm.

4. A pressure measuring device including a seal diaphragm having a first surface opposing a target fluid and a second surface contacting a pressure transfer sealed liquid, and measuring means for measuring a pressure of the target fluid on the basis of a displacement amount of said seal diaphragm which is transferred by the sealed liquid, comprising:

an insulating film formed directly on to wholly cover the first surface of said seal diaphragm; and a p-type semiconductor film formed directly on to wholly cover said insulating film.

5. A device according to claim 4, wherein said insulating film insulates said seal diaphragm from said p-type semiconductor film, and said p-type semiconductor film repels hydrogen ions in the target fluid to prevent generation of hydrogen atoms near said seal diaphragm, thereby preventing hydrogen atoms from being permeated through said seal diaphragm.

6. A device according to claim 4, wherein each of said insulating film and said p-type semiconductor film is formed to have a thickness of several μm.

\* \* \* \* \*